(12) United States Patent
Trionfetti

(10) Patent No.: US 6,471,452 B2
(45) Date of Patent: Oct. 29, 2002

(54) PROCESS AND APPARATUS FOR BALANCING ROTATING BODIES, IN PARTICULAR ROTORS OF ELECTRIC MOTORS

(75) Inventor: Gianni Trionfetti, Agrate Brianza (IT)

(73) Assignee: Balance Systems S.p.A., Milan (IT)

( * ) Notice: Subject to any disclaimer, the term of this patent is extended or adjusted under 35 U.S.C. 154(b) by 0 days.

(21) Appl. No.: 09/865,554

(22) Filed: May 29, 2001

(65) Prior Publication Data

US 2002/0044846 A1 Apr. 18, 2002

(51) Int. Cl.⁷ .................................................. B23C 1/14
(52) U.S. Cl. ........................... 409/132; 73/462; 82/903; 409/162; 409/165; 409/189; 409/191
(58) Field of Search ................................ 409/132, 131, 409/133, 166, 164, 165, 162, 188, 189, 191; 73/462; 82/903

(56) References Cited

U.S. PATENT DOCUMENTS

| 4,442,712 A | * | 4/1984 | Junck et al. ................. 409/133 |
| 5,871,314 A | * | 2/1999 | Trionfetti ..................... 409/165 |

* cited by examiner

*Primary Examiner*—William Briggs
(74) *Attorney, Agent, or Firm*—Browdy and Neimark

(57) ABSTRACT

The process contemplates material removal from the surface of rotating bodies (11) by moving at least one milling cutter (5) along an arched trajectory (21) in a plane transverse to the axis of the bodies, so as to remove the material in the circumferential direction of the body surface and parallel to the axis of the milling cutter (5). This working can be carried out in addition to a vectorial milling. The trajectory (21) is obtained by composing two linear translations perpendicular to the milling cutter (5) by adjustment of the speed and the rotation direction of the motors producing such translations.

16 Claims, 3 Drawing Sheets

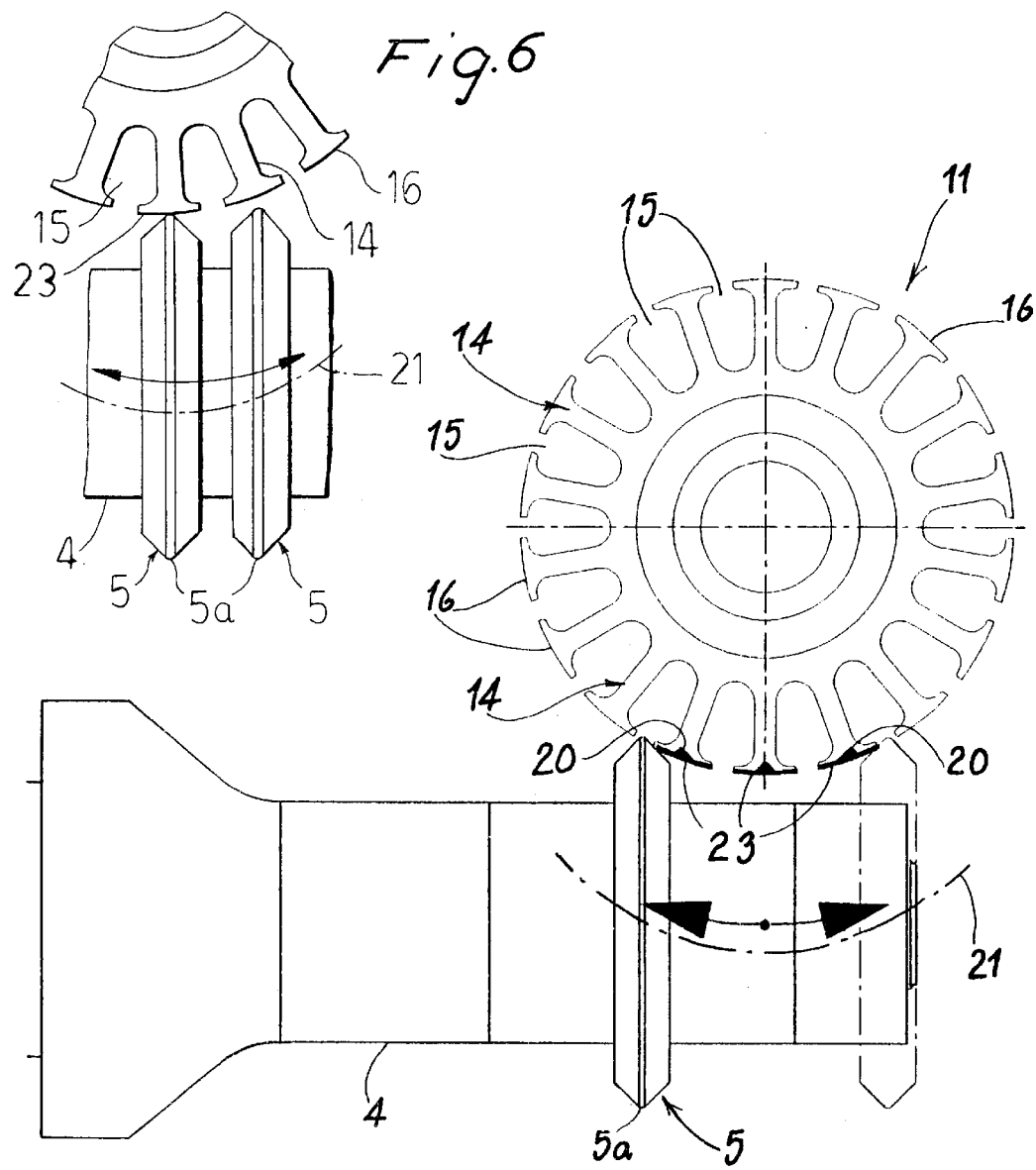

PROCESS AND APPARATUS FOR BALANCING ROTATING BODIES, IN PARTICULAR ROTORS OF ELECTRIC MOTORS

FIELD OF THE INVENTION

The present invention relates to a process and an apparatus for balancing rotating bodies, in particular rotors of electric motors.

More specifically the invention relates to balancing of rotating bodies by material removal from the peripheral surface thereof, depending on data supplied by a measurement unit establishing the amount and angular position of the unbalances to be eliminated in balancing planes disposed at right angles to the rotation axis of the rotating bodies.

The detected data is sent to a work unit of the apparatus generally comprising one or more rotating tools, in particular milling cutters, that are operated to carry out material removal in an appropriate amount and position, by one or more milling operations at each balancing plane.

For carrying out rotor balancing in electric motors it is necessary to consider the fact that they are made up of plate-like packs having radial segments spaced apart the same distance from each other, that separate the housing slots of the electric windings and exhibit expansions, at the outer end thereof, extending in a circumferential direction and separated from each other.

Material removal for balancing must be carried out on these expansions that on the other hand have a modest thickness so that it is not possible to penetrate too deeply thereinto with the tool, otherwise the expansions themselves will be weakened and windings will be damaged. This restriction is particularly felt in the case of small motors, such as motors for household appliances, electric tools and the like. Since the unbalance plane is not always coincident with the axial plane of symmetry of the segments, it is not always possible to operate with the tools in the middle of the expansion width, where the greatest material mass is present. It is then necessary to vectorially resolve the unbalance into two or more components in directions constrained by the pitch existing between the expansions, so as to distribute the material removal in the central regions of two or more adjacent expansions.

DESCRIPTION OF THE PRIOR ART

For the above purpose balancing apparatus are known which are provided with two or more tools, in particular milling cutters, disposed spaced apart from each other on the same rotating shaft extending perpendicular to the rotation axis of the rotor to be balanced, the distance between the tools depending on the pitch of the rotor expansions.

The tool carrier shaft is movable in directions orthogonal to each other and specifically substantially tangential to the rotor and radial thereto, to position the tools on the expansion surface and then make them penetrate thereinto. Furthermore, the shaft is movable parallel to the rotor axis to move the tools forward for material removal.

The rotor is such supported that it can be angularly rotated and fastened in front of the tools at an angular position corresponding to the unbalance or to the vectorial resultant of the unbalance.

Combination of the positioning movements of the tool carrier shaft and the rotor, carried out automatically on apparatus of the known art, based on the unbalance data detected by the measurement unit, allows the tools and the expansions to be brought to such a mutual position that preestablished material amounts can be removed from several expansions, always operating in the middle of the expansion width and in such a manner that the overall amount of the removed material corresponds to the resulting mass to be removed in the unbalance plane.

These apparatus carrying out the so-called vectorial milling, generally allow quick balancing operations, by virtue of the presence of several milling cutters operating simultaneously. On the other hand, depending of the shape of the rotor slots, replacement of the milling tools may be required and this involves slowing down in working.

In addition, although working can be carried out simultaneously with several tools, the restriction imposed by the fact that it is necessary to operate in the middle of the expansions does not always allow the material removal capacity to be maximised.

Furthermore, with these apparatus it is difficult to remedy possible working errors leading to a balancing which is not quite satisfactory or does not fall within the tolerance limits. In fact, a second milling operation asks for the second cut to be exactly superposed on the first one, otherwise the milling cutter does not remove the programmed material alone but it does remove other material too on a side of the first notch, and this precise positioning is of very difficult achievement. Consequently, when the workpieces have been already milled during a first cut and, on checking, they do not fall within the tolerance limits, recovery of same by a further milling operation can be hardly obtained.

Also known are balancing apparatus utilising a milling cutter rotating around an axis transverse to the axis of the rotor to be balanced, which cutter has an outline in the form of a concave arc of a circle of a diameter substantially as long as the diameter of the outer outline of the rotor so that the rotor geometrically fits the milling cutter concavity.

The cutting outline of the milling cutter generally encompasses several rotor expansions, so that it is possible to remove material from several adjacent expansions simultaneously and symmetrically with respect to the unbalance plane.

This system carrying out the so-called polar milling however, has the drawback that it cannot work very deeply, since the tool operates over the whole width of the expansions. In addition, a different tool for each rotor diameter is required. Finally, balancing apparatus are known that are such structured that they can carry out both vectorial milling and polar milling with one and the same tool. These apparatus however need a particular rotating tool, capable of removing material in two different directions on the expansion surface, and related actuating means capable of bringing the tool into engagement with the expansions forming a predetermined angle and of moving it forward during the vectorial milling. Polar milling is on the contrary carried out by rotating the rotor. Since the rotor is rotated under the effort exerted by the tool, it is necessary to provide for an appropriate rotor engagement system by acting on the shaft of the rotor itself.

SUMMARY OF THE INVENTION

Under this situation the present invention aims at providing a process and an apparatus for balancing of rotating bodies, in particular rotors of electric motors, that are able to substantially overcome the above described drawbacks.

In particular, it is an aim of the invention to provide a balancing process and the related balancing apparatus that substantially reduce the requirement of replacing the tool when balancing of rotating bodies of different configuration is concerned, in the case of rotors having different slot conformations or different diameters for example.

It is a further aim of the invention to provide a balancing process and apparatus enabling increase of the material removal capacity using the same tool.

A still further aim of the invention is to provide a process and an apparatus of the above specified type enabling balancing of already milled pieces that do not yet fall within predetermined tolerance limits.

Another aim of the invention is to accomplish a balancing process and apparatus that can mostly utilise structural and operating elements already present in known apparatus, so that important modifications of the apparatus themselves is not required.

These aims are achieved by a process for balancing rotating bodies like rotors of electric motors, of the type comprising removing material from surface portions of said bodies, and in which at least one rotating tool is caused to penetrate into said surface portions at an axial unbalance plane of said bodies and is caused to move forward substantially parallel to a rotation axis of said bodies for removing a preset amount of said material, wherein said at least one rotating tool is also caused to carry out a translation along an arched work trajectory for removing material from said surface portions substantially in a circumferential direction of said bodies.

For performing said process there is provided an apparatus for balancing rotating bodies like rotors of electric motors, by removing material from surface portions of said bodies at an unbalance plane passing through a rotation axis of said bodies, comprising a support for at least one of said bodies and at least one rotating tool displaceable along two directions perpendicular to said rotation axis and along a direction parallel to said rotation axis, and further comprising means for causing said at least one rotating tool to carry out a translation along an arched work trajectory lying in a plane substantially transverse to said rotation axis of said bodies.

BRIEF DESCRIPTION OF THE DRAWINGS

The invention will now be described in more detail based on a preferred embodiment thereof illustrated by way of non-limiting example in the accompanying drawings, in which:

FIG. 4 is a possible mode of carrying out balancing in accordance with the invention;

FIG. 6 is an elevation view of part of an apparatus provided with two rotating tools.

DESCRIPTION OF THE PREFERRED EMBODIMENTS

Figure 1:
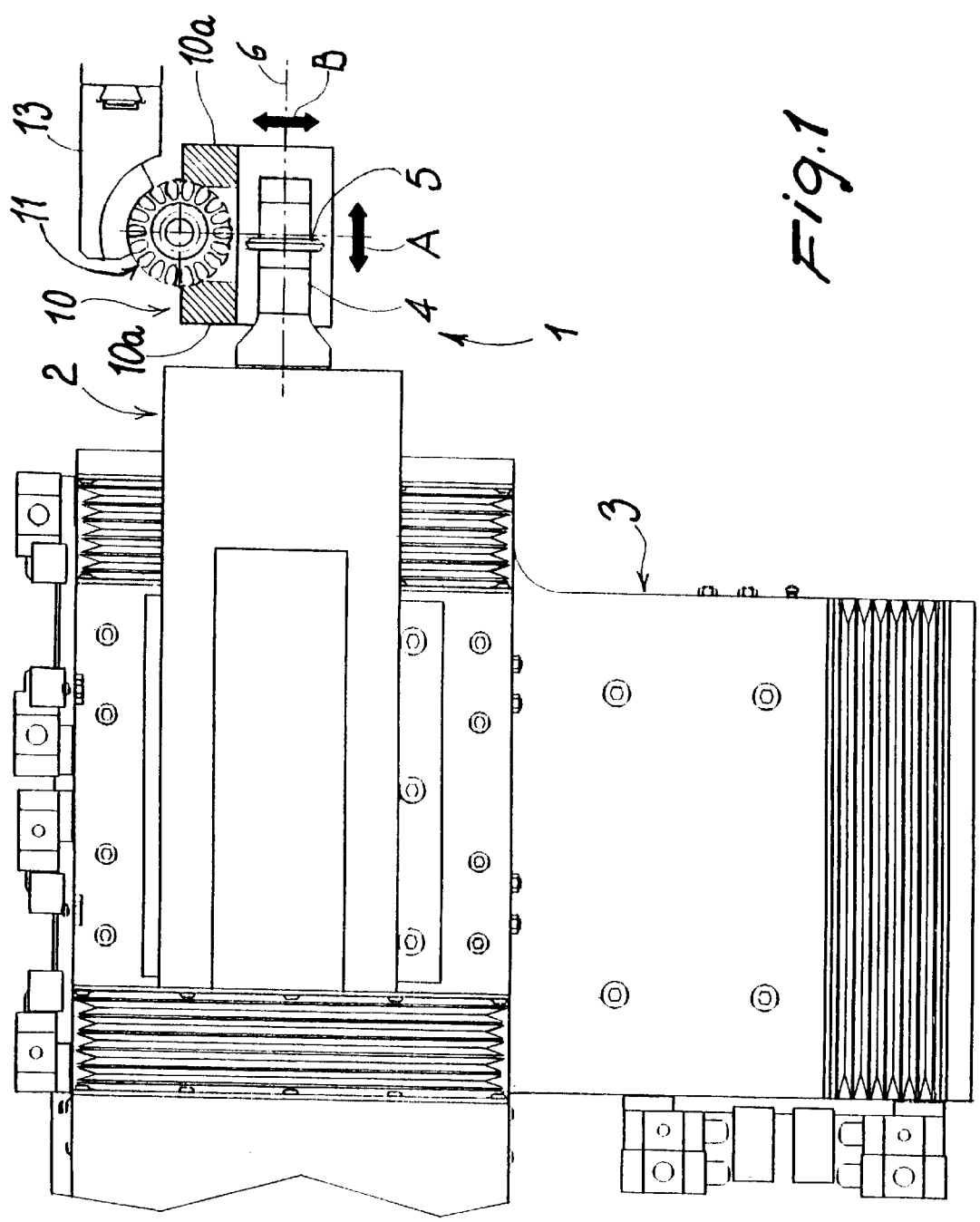
FIG. 1 is an elevation side view of an apparatus in accordance with the invention.

With reference to the drawings, the apparatus in accordance with the invention is generally identified by reference numeral 1. It substantially comprises, in a manner known in itself, a work head 2, disposed on a bed 3 and carrying a rotating shaft 4 on which a work tool, a milling cutter 5 of known type for example, is mounted.

Shaft 4 turns around a horizontal axis 6 and is driven in rotation by a motor not shown.

Figure 5:
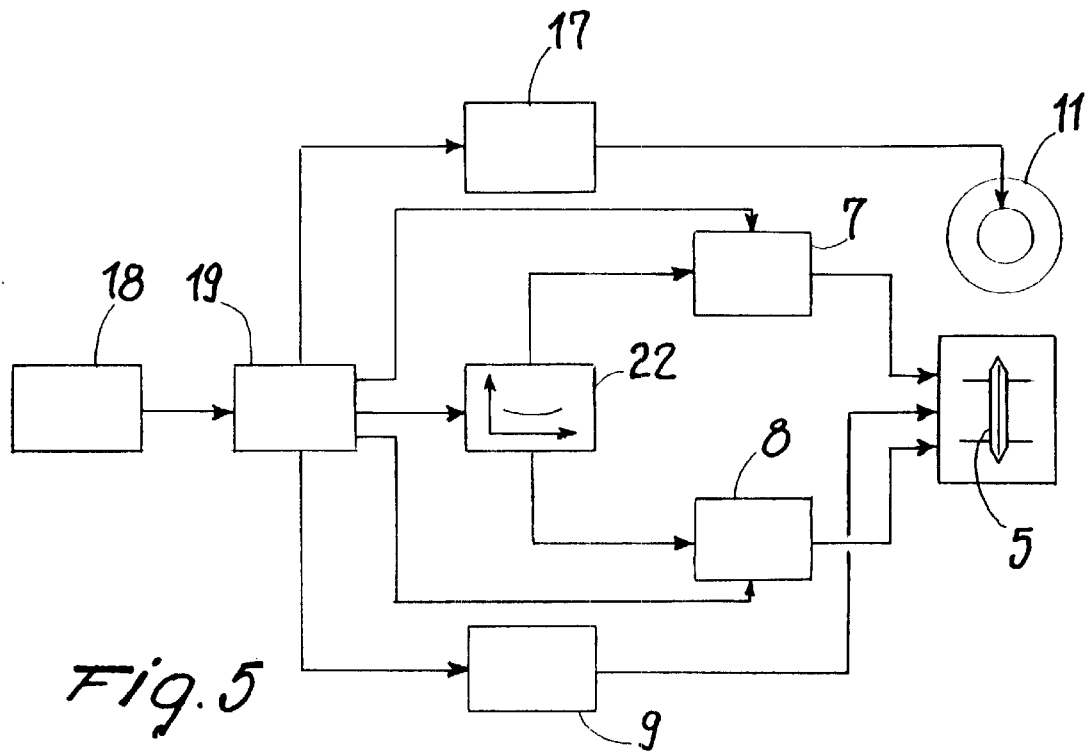
FIG. 5 is an operating diagram of the apparatus of the invention.

The head 2 is movable by translation in two perpendicular directions A and B, that in the embodiment shown correspond to a horizontal direction and a vertical direction, through first and second driving means of known type, e.g. electric motors, diagrammatically denoted by 7 and 8 respectively in FIG. 5. Therefore to these linear translations of head 2, identical linear translations of the shaft 4 and milling cutter 5 correspond.

Figure 2:
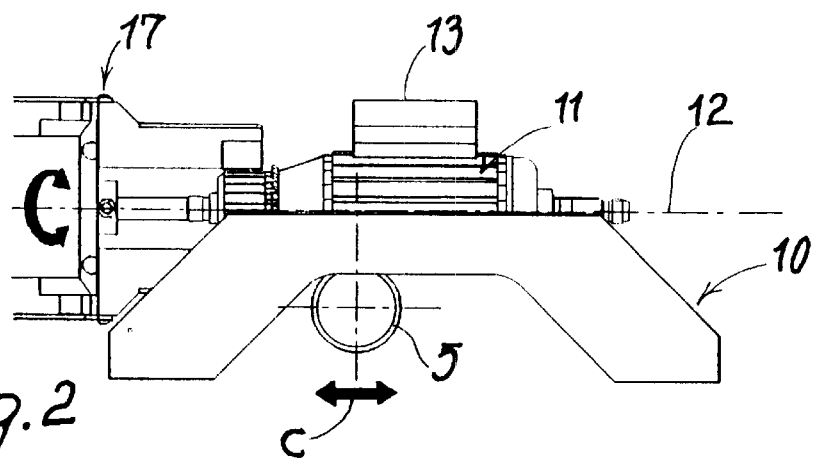
FIG. 2 is a front view of the apparatus portion where balancing takes place.
Figure 3:
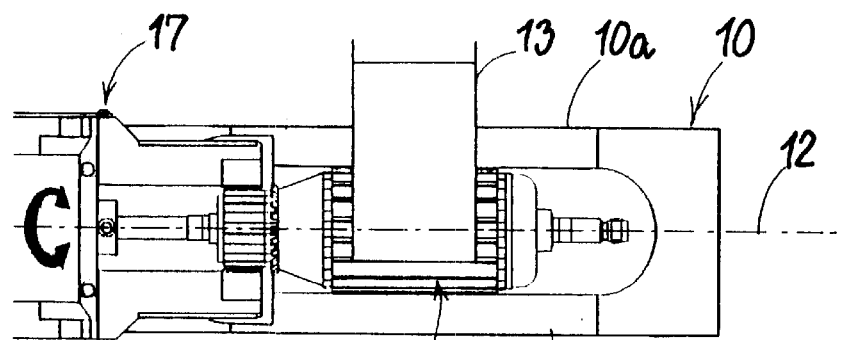
FIG. 3 is a plan view of the same apparatus portion.

Shaft 4 and/or head 2 are also linearly movable by translation in a direction perpendicular to the plane in FIG. 1, which direction is identified by C in FIG. 2, in a manner known by itself, through third driving means like a motor 9 (FIG. 5).

At a position overlaying the shaft 4 and milling cutter 5, apparatus 1 comprises a support structure 10, substantially in the form of a bridge and adapted to keep a rotating body in place, in particular a rotor 11 of an electric motor as shown, with its rotation axis 12 perpendicular to directions A and B and parallel to direction C. Rotor 11 is kept in a locked position in an manner known by itself between locking means comprising two crosspieces 10a of the fixed structure 10 and a pressure arm 13 that can be moved away to enable rotor 11 to be set in place and removed.

Rotor 11, which has a plurality of segments 14 confining slots 15 for housing electric windings and having respective expansions 16 externally defining portions of a cylindrical surface, can be fastened in a plurality of angular positions corresponding to the positions of the unbalance planes in which material removal must be carried out for balancing purposes, as well-known to those skilled in the art. The angular positioning of rotor 11 is accomplished by a positioning device 17 of known type, which therefore is not described in 15 detail; said positioning device is driven depending on the unbalance data detected by an appropriate measurement unit 18 (FIG. 5) and processed by a central processing and control unit 19, so as to automatically position rotor 11 in a precise manner to the required angular position at which it is held fast by the already described means 10a and 13.

Apparatus 1, provided with a milling tool 5, is adapted to carry out a vectorial milling at an axial unbalance plane, causing the milling cutter 5 to penetrate into the central region of expansions 16 of rotor 11, in a substantially radial direction B, and making the milling cutter 5 suitably move forward in the direction C which is parallel to axis 12 of rotor 11, so as to remove material along a predetermined longitudinal length of the expansions 16 and carry out a corresponding furrow 20 in the concerned expansions. A similar furrow will be executed in the same expansions 16 at a symmetrical position relative to the transverse middle plane of rotor 11 in the other balancing plane, in a manner known by itself.

Linear translation displacements of shaft 4 in the directions A, B and C are controlled by the central control unit 19, as diagrammatically shown in FIG. 5, according to the required position, depth and length of material removal computed by the unit 19 in response to the unbalance data coming from the measurement unit 18.

In accordance with an aspect of the invention, apparatus 1 is also able to carry out a polar milling, without changing the milling cutter 5. In fact provision is made for means adapted to make the milling cutter 5 perform a translation along an arched work trajectory 21, i.e. a trajectory having an arched shape, in a plane transverse to the rotation axis 12 of rotor 11, in particular a trajectory in the form of an arc of a circumference the centre of which is in the unbalance plane and which is substantially concentric with axis 12 of rotor 11, for material removal substantially in the circumferential direction from one or more expansions 16 of rotor 11, as identified by a two-headed arrow in FIG. 4.

This translation is obtained by suitably composing the linear translations A and B, in either of the two ways or directions, and correspondingly controlling instant by instant the speed and rotation direction of each of the motors 7 and 8 through speed and direction adjustment means 22 operated by the central unit 19, as it appears from the diagram in FIG. 5. In other words, the speed and rotation direction of each of motors 7 and 8 are instantaneously and simultaneously controlled to confer to the rotating tool or milling cutter 5 a displacement according to a curve along which the cutting edge of the tool provides the required removal of material in quantity and position for reaching balancing of the rotor 11.

Therefore, in accordance with the invention a balancing process is accomplished in which a tool, in particular a milling cutter 5 capable of carrying out a vectorial milling, is in addition caused to move along an arched work trajectory 21, in particular in the form of an arc of a circumference the centre of which lies in the unbalance plane passing through the rotation axis 12 of rotor 11 to be balanced, and in engagement with the rotor 11 itself, for material removal substantially in a circumferential direction from surface portions of rotor 11. In particular, trajectory 21 can be of such a nature that the cutting outline 5a of the milling cutter 5 moves on an arc of a circumference concentric with the rotation axis 12 of rotor 11 and of a slightly smaller radius than that of the outer circumference defined by expansions 16, so as to form a circumferential furrow 23 of constant depth over the whole width of one or more expansions 16.

The features of the circumferential furrow(s) 23 and the number of expansions 16 concerned with said furrows are established by the central control unit 19 15 based on the unbalance data detected by the measurement unit 18.

Material removal by polar milling is advantageously carried out after material removal by vectorial milling, but it is also possible to act in the opposite way. The case of one tool or milling cutter 5 has been herein described, but it is also possible to use more than one tool, two milling cutters 5 for example, as shown in FIG. 6, which are disposed spaced apart from each other by an amount substantially corresponding to the spacing of expansions 16 or a multiple of said spacing. In this case for carrying out the circumferential furrows 23, one of the milling cutters 5 is driven for material removal in one direction along a work trajectory 21, whereas the other milling cutter 5 is driven for material removal in the opposite direction along the same trajectory.

The invention achieves important advantages.

Firstly, both vectorial milling and polar milling can be carried out without any tool change and without using special tools, since milling cutters 5 of the traditional type can be substantially employed.

Even when balancing of rotating bodies of different diameters is to be carried out, change of the tool is not required because the work trajectory 21 of the tool can be always adapted to the outer circumference of these bodies.

In addition, known balancing apparatus adapted for vectorial milling need not be substantially modified, but it is sufficient to provide them with appropriate means for adjustment of the speed and the rotation direction of the motors carrying out the horizontal and vertical translation of the tool carrier shaft, so that the tool or tools will be able to accomplish a composite movement resulting in an arched trajectory.

Also the fastening and positioning structure of the rotor can be of a type known by itself and a special engagement of the rotor is not required. Due to the possibility of carrying out a polar milling on vectorially-milled workpieces, recovery of workpieces already submitted to vectorial milling that however do not fall within the tolerance limits can be achieved, since with the additional polar milling in accordance with the invention, said workpieces can be brought to within the prescribed tolerances without carrying out a second vectorial-milling operation in the same furrows, which, as said at the beginning, will hardly reach the desired result.

The possibility of making the polar milling with the same milling cutters already employed for the vectorial milling in the same rotor enables the material removal capacity to be increased and the vectorial milling to be improved, so that the balancing result will be optimised and the number of workpieces not falling within the tolerance limits and therefore to be discarded will be greatly reduced.

Advantageously, polar milling can be restricted to only part of the width of the individual expansions 16 or it can be carried out in a non-symmetric manner on contiguous expansions, depending on the requirements resulting from the position of the unbalance plane and the necessity to obtain narrow balancing tolerances.

Accomplishment of polar milling operations of a different depth in adjacent expansions 16 would be also possible by suitably controlling the work trajectory of the tool or tools. In particular, the depth of the circumferential furrows 23 could progressively decrease towards the outside of the unbalance region, by moving the work outline of the tool according to an arc of a circumference of a greater radius than that of the outer outline of expansions 16.

What is claimed is:

1. An apparatus for balancing rotating bodies by removing material from surface portions of said bodies at an unbalance plane thereof passing through a rotation axis of said bodies, comprising:
   a support for at least one of said bodies;
   at least one rotating tool;
   means for displacing said at least one rotating tool along two directions substantially perpendicular to each other and to said rotation axis, and along a further direction substantially parallel to said rotation axis;
   means for controlling displacement of said at least one rotating tool to cause translation thereof along a work trajectory having an arched shape in a plane substantially transverse to said rotation axis of said bodies.

2. An apparatus as claimed in claim 1, wherein said work trajectory is in the form of an arc of a circumference having a center lying in said unbalance plane.

3. An apparatus as claimed in claim 1, wherein said work trajectory is concentric with said rotation axis of said bodies.

4. An apparatus as claimed in claim 1, wherein said work trajectory is concentric with said rotation axis of said bodies and has a greater radius than said surface portions.

5. An apparatus as claimed in 1, comprising means for locking said rotating bodies on said support during operation of said at least one rotating tool.

6. An apparatus as claimed in claim 1, wherein said displacing means comprise first and second driving means for translating said at least one rotating tool along a respective one of said two directions substantially perpendicular to each other and to said rotation axis, and control means for simultaneously adjusting each of said first and second driving to impose to said at least one rotating tool a composed translation resulting in said arched work trajectory.

7. An apparatus as claimed in claim 1, wherein said at least one rotating tool comprises at least one milling cutter.

8. An apparatus for balancing rotating bodies by removing material from surface portions of said bodies at an unbalance plane thereof passing through a rotation axis of said bodies, comprising:

a support for at least one of said bodies;

at least two rotating tools;

means for displacing said at least two rotating tools along two directions substantially perpendicular to each other and to said rotation axis, and along a further direction substantially parallel to said rotation axis;

means for controlling displacement of said at least two rotating tools to cause translation thereof along a work trajectory having an arched shape in a plane substantially transverse to said rotation axis of said bodies;

wherein said rotating bodies comprise rotors of electric motors each having a plurality of spaced segments defining therebetween housing slots for electric windings, said segments having respective expansions defining externally portions of a cylindrical surface; and wherein said at least two rotating tools are disposed spaced apart from each other by an amount substantially corresponding to the spacing of said segments or to a multiple of said spacing.

9. A process for balancing rotating bodies, wherein material is removed from surface portions of said bodies at an axial unbalance plane thereof by means of at least one rotating tool penetrating into said surface portions, the process comprising the steps of:

displacing said at least one rotating tool in a direction substantially parallel to a rotation axis of said bodies for removing a preset amount of said material from said surface portions in a generally axial direction thereof; and controlling said at least one rotating tool to translate substantially in a circumferential direction of said bodies along a work trajectory having an arched shape for removing material from said surface portions in a generally circumferential direction thereof, wherein said displacing and said controlling steps are carried out in a selected succession.

10. A process as claimed in claim 9, wherein said work trajectory is in the form of an arc of a circumference having a center lying in said unbalance plane.

11. A process as claimed in claim 9, wherein said at least one rotating tool has a work outline and is controlled to cause said work outline to carry out a translation along said work trajectory, said work trajectory being concentric with said rotation axis of said bodies.

12. A process ass claimed in claim 9, wherein said at least one rotating tool has a work outline and is controlled to cause said work outline to carry out a translation along said work trajectory, said work trajectory being concentric with said rotation axis of said bodies and having a greater radius than said surface portions.

13. A process as claimed in claim 9, wherein said bodies are held fast while said at least one rotating tool is controlled to translate along said work trajectory.

14. A process for balancing rotating bodies, wherein material is removed from surface portions of said bodies at an axial unbalance plane thereof by means of at least two rotating tools capable of penetrating into said surface portions, the method comprising the steps of:

displacing said at least two rotating tools in a direction substantially parallel to a rotation axis of said bodies for removing a preset amount of said material by means of at least one of said tools from said surface portions in a generally axial direction thereof; and controlling said at least two rotating tools to translate substantially in a circumferential direction of said bodies along a work trajectory having an arched shape for removing material by at least one of said tools from said surface portions in a generally circumferential direction thereof;

wherein said displacing and said controlling steps are carried out in a selected succession;

wherein said rotating bodies comprise electric motors each having a plurality of spaced segments forming therebetween housing slots for electric windings, said segments having respective expansions shaped externally as portions of a cylindrical surface; and wherein said at least two rotating tools are disposed spaced apart from each other by an amount substantially corresponding to the spacing between said segments or a multiple of said spacing, one of said rotating tools being translated in one way and another of said rotating tools being translated in an opposite way along said work trajectory to remove material from different of said expansions.

15. A process for balancing rotating bodies, comprising removing material from surface portions of said bodies by at least one rotating tool which is caused to penetrate into said surface portions at an axial unbalance plane of said bodies and is caused to move forward substantially parallel to a rotation axis of said bodies for removing a preset amount of said material, wherein said at least one rotating tool is also caused to carry out a translation along an arched work trajectory for removing material from said surface portions substantially in a circumferential direction of said bodies, wherein said rotating bodies comprise rotors of electric motors having a plurality of spaced segments forming therebetween housing slots for electric winding;

said segments having respective expansions shaped externally as portions of a cylindrical surface, and wherein at least two rotating tools are disposed spaced apart from each other by an amount substantially corresponding to the spacing between said segments or a multiple of said spacing, one of said rotating tools being translated in one way and another of said rotating tools being translated in an opposite way along said arched work trajectory to remove material from different of said expansions.

16. An apparatus for balancing rotating bodies by removing material from surface portions of said bodies at an unbalance plane passing through a rotation axis of said bodies, comprising a support for at least one of said bodies and at least one rotating tool displaceable along tow directions perpendicular to said rotation axis and along a direction parallel to said rotation axis, and further comprising means for causing said at least one rotation tool to carry out a translation along an arched work trajectory lying in a plane substantially transverse, to said rotation axis of said bodies, wherein said rotating bodies comprise rotors of electric motors each having a plurality of spaced segments defining therebetween housing slots for electric windings, said segments having respective expansions defining externally portions of a cylindrical surface, and wherein the apparatus comprises at least two rotating tools disposed spaced apart from each other by an amount substantially corresponding to the spacing of said segments or to a multiple of said spacing.

* * * * *